Nov. 29, 1966     M. M. POLLOCK     3,288,130

DEVICE FOR LEVELING PANS

Filed Nov. 23, 1964

INVENTOR
Mary M. Pollock

United States Patent Office 3,288,130
Patented Nov. 29, 1966

3,288,130
DEVICE FOR LEVELING PANS
Mary M. Pollock, 132 Beisner Ave., Pittsburgh, Pa.
Filed Nov. 23, 1964, Ser. No. 412,925
7 Claims. (Cl. 126—215)

This invention relates to a device for leveling pans resting on a cooking stove grate.

Whenever the bottom surface of a frying or cooking pan is not level, any cooking requiring grease and uniform heat becomes difficult. Grease builds up on one side of the pan and foods stick to the surface portion without the grease. If a space exists between any part of the stove grate and the pan a uniform heat throughout the bottom of the pan is impossible. The tops of many cooking stove grates are not level. This is due to the manufacture and assembly of the stove or to unlevel flooring on which the stove rests. Old pans are warped and the bottom surfaces of the pans are not level.

In order to make pans resting on a cooking stove grate level, devices have been used which are attached to the pan. This type of arrangement is cumbersome making cooking in the pan and subsequent washing difficult. Generally the attachments lack flexibility and cannot be adapted to pans of all sizes and shapes.

The present invention is a device for leveling any size or shape of pan on a cooking stove grate. The device is not attached to the pan but rather is attached to the cooking grate leaving the pan free for unobstructed cooking and immediate removal from the grate for washing. The device is flexible in that it provides a multiple angle of tilt in order to make the pan level.

I provide a device for leveling pans resting on a stove grate comprising a planar circular segment strip of material having two ends, each end having a lug extending downward for gripping the stove grate when resting on the stove. I preferably provide that the segment strip of material has an inner radius and an outer radius and that each end has a lug extending angularly downward from the inner radius and that the outer radius has a lug extending angularly downward. These lugs engage an electric stove coil when the circular segment strip rests on the top of the electric stove grate. I provide additional circular segment strips of successively shorter lengths having lugs extending from the inner radius and outer radius angularly downward to engage the preceding circular segment whereby varying angles of tilt are provided for a pan resting on the device and stove grate.

I provide a device for leveling pans resting on a gas stove grate comprising a planar circular segment strip of material having an inner radius and an outer radius, the segment strip having two ends, each end having a U-shaped projection extending downward and rearward, the U-shaped projections engage the stove grate. I provide a plurality of circular segments of successive shorter lengths having lugs angularly extending downward from an inner radius and an outer radius engaging the preceding planar circular segment, whereby varying angles of tilt are provided for leveling a pan on a stove grate.

Other details, objects and advantages of the invention will become apparent as the following description of a certain present preferred embodiment thereof proceeds.

In the accompanying drawings I have shown certain present preferred embodiments of the invention in which FIGURE 1 is a plan view of the device engaging an electric stove coil grate;

Figure 1:
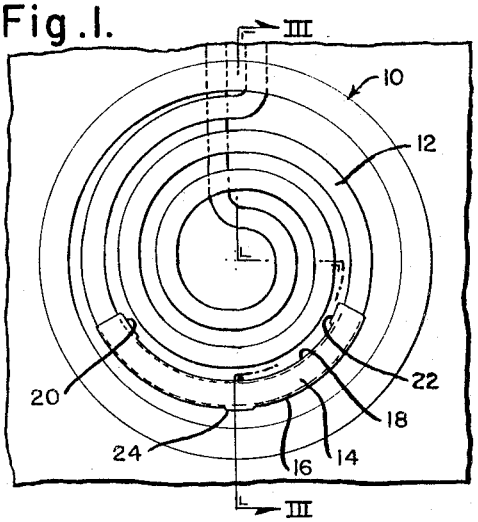

FIGURE 1 shows a top view of an electric stove grate generally shown as 10 having a heating coil 12. A planar circular segment strip of malleable material 14 rests on one part of the coil 12. The planar circular segment strip 14 has an outer radius 16 and an inner radius 18. Lugs 20 and 22 extend angularly downward from the inside radius 18 and engage the coil 12. Lug 24 extends angularly downward from the outer radius 16 and engages the coil 12.

Figure 4:
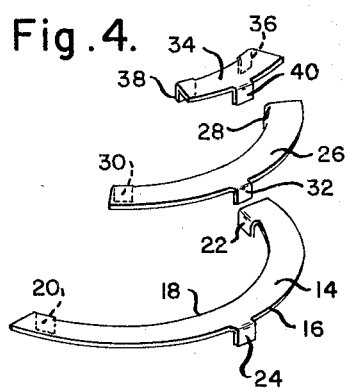
FIGURE 4 is a perspective exploded view of the device.
Figure 5:
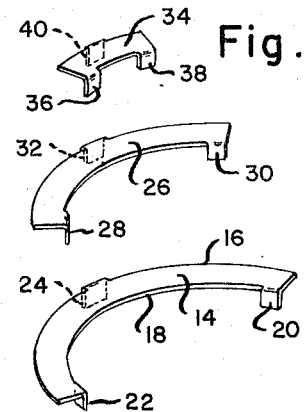
FIGURE 5 is a perspective exploded view of the device shown in FIGURE 4 from a different angle.

FIGURES 4 and 5 show a plurality of planar circular segment strips having successive shorter lengths. Planar circular segment strip 26 has lugs 28, 30 and 32 which engage planar circular segment strip 14. Planar circular segment strip 26 rests on top of planar circular segment strip 14 to increase the height of the device for leveling a pan. Planar circular segment strip 34 having lugs 36, 38 and 40 engage planar circular segment strip 26 whenever planar circular segment strip 34 rests on the segment 26. Planar circular segment 34 can also rest on circular segment 14 adjacent to segment 26 which is circumferentially shifted to provide room for segment 34. This arrangement provides stability.

Figure 3:
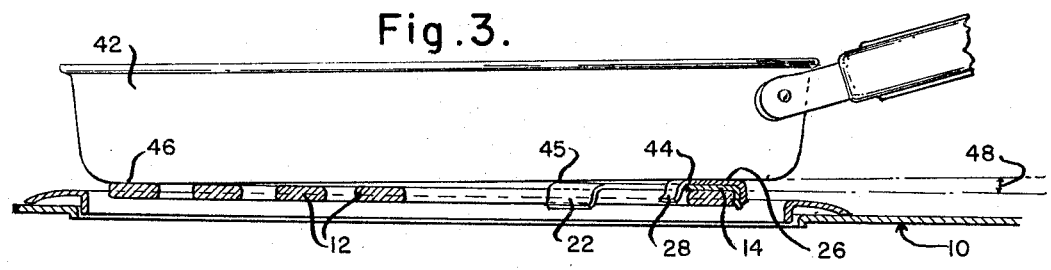
FIGURE 3 is a sectional view taken on the line III—III of FIGURE 1 having a pan in place.

FIGURE 3 shows a frying pan 42 resting on electric coil 12 and segment 26 which is resting on segment 14 having a lug 22 engaging the coil 12. Segment 26 has a lug 28 engaging segment 14. The frying pan 42 rests at points 44, 45 and 46 whereby the pan 42 is made level by providing an angle 48 formed between bottom surface of the pan 42 and the top of coil 12 at point 46. Grease and water will now flow evenly over the bottom of the pan 42. If increased height is desired in the vicinity of point 44, an additional segment 34 may be added to segment 26.

The segment 14 may be shifted anywhere on the coil 12 depending on what side of the pan 42 must be raised to make it level. The lugs 20, 22 and 24 prevent horizontal movement on the coil 12.

Figure 2:
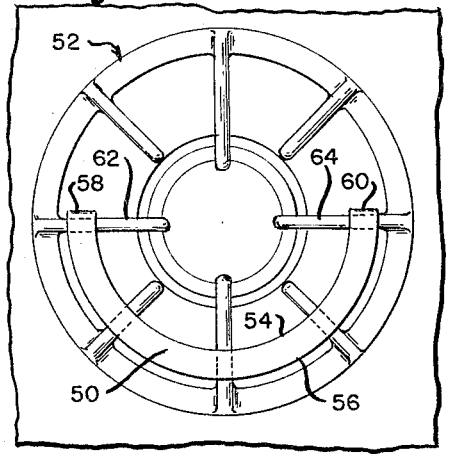
FIGURE 2 is a plan view of the device engaging a gas stove grate.

FIGURE 2 shows a planar circular segment strip of material 50 resting on a gas stove grate generally shown as 52.

Figure 6:
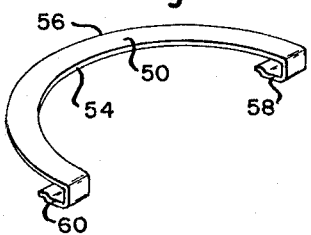
FIGURE 6 is a perspective exploded view of the device.
Figure 7:
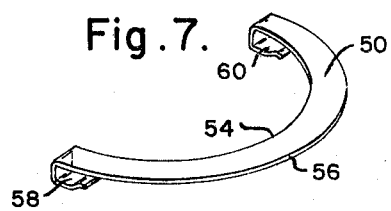
FIGURE 7 is a perspective exploded view of the device shown in FIGURE 6 from a different angle.

Referring to FIGURES 6 and 7, segment 50 has an inner radius 54, an outer radius 56 and U-shaped projections 58 and 60 on each end of the strip 50 extending downward and rearward. The projections 58 and 60 clip onto stove grate projections 62 and 64 respectively, preventing horizontal movement on the stove grate. The segment 50 can have its projections 58 and 60 engage any of the other stove projections thereby making level any side of a pan. In order to provide additional height to the segment 50, additional segments 26 and/or 34 can rest on top of segment 50. This will provide additional height in order to make a frying pan resting on the grate 52 level.

The discussion of the device for leveling pans has been directed to the top of a cooking stove grate. It is to be understood, however, that the device is also designed to be used on top of an oven grate to make pans level in the oven.

While I have shown and described certain present preferred embodiments of the invention, it is to be distinctly understood that the invention is not limited thereto but may be otherwise variously embodied within the scope of the following claims.

I claim:

1. In combination with a stove grate a device for leveling pans comprising a planar circular segment strip of material having two ends, each end having a lug extending downward for gripping the stove grate when resting on the stove.

2. In combination with an electric stove coil a device for leveling pans comprising a planar circular segment strip of material having an inner radius and an outer radius, the segment strip having two ends, each end having a lug extending angularly downward from the inner radius, the outer radius having a lug extending angularly downward, the lugs engaging the stove coil to prevent horizontal movement.

3. In combination with an electric stove coil a device for leveling pans comprising:
  (a) a first planar circular segment strip of material having an inner radius and an outer radius, the segment strip having two ends, each end having a first and second lug extending angularly downward from the inner radius, the outer radius having a third lug extending downward, the lugs engaging the stove coil to prevent horizontal movement; and
  (b) a second planar circular segment strip of material of shorter length than the first planar circular segment strip, the second strip of material having an inner radius and an outer radius, the segment strip having two ends, each end having a fourth and fifth lug extending angularly downward from the inner radius, the outer radius having a sixth lug extending downward, the second planar circular segment resting upon the first planar circular segment and the lugs of the second planar segment engage the first planar circular segment.

4. In combination with an electric stove coil a device for leveling pans comprising a plurality of planar circular segment strips of varying lengths, each segment strip having two ends, each end having a first and second lug extending angularly downward from the inner radius, the outer radius having a third lug extending angularly downward, the lugs of the longest segment engaging the stove coil, the shorter segments resting successively on top of the longest segment and the lugs of each successive segment engaging the preceding segment.

5. In combination with a gas stove grate a device for leveling pans comprising a planar circular segment strip of material having an inner radius and an outer radius, the segment strip having two ends, each end having a U-shaped projection extending downward and rearward, the U-shaped projections engaging the stove grate.

6. In combination with a gas stove grate a device for leveling pans comprising:
  (a) a first planar circular segment strip of material having two ends, each end having a U-shaped projection extending downward and rearward, the U-shaped projections engaging the stove grate; and
  (b) a second planar circular segment strip of material of shorter length than the first planar circular segment strip, the second planar circular segment having an inner radius and an outer radius, the segment strip having two ends, each end having a first and second lug extending angularly downward from the inner radius, the outer radius having a third lug extending downward, the second planar circular segment resting upon the first planar circular segment and the lugs of the second planar segment engage the first planar circular segment.

7. In combination with a gas stove grate a device for leveling pans as recited in claim 6 including a third planar circular segment strip of material shorter in length than the second planar circular segment having an inner radius and an outer radius, the segment strip having two ends, each end having a fourth and fifth lug extending angularly downward from the inner radius, the outer radius having a third lug extending downward, the third planar circular segment resting upon the second planar circular segment, the lugs of the third circular segment engaging the second planar circular segment.

References Cited by the Examiner

UNITED STATES PATENTS

| | | | |
|---|---|---|---|
| 2,632,436 | 3/1953 | Williams | 126—214 |
| 2,678,643 | 5/1954 | Williams | 126—214 |
| 2,871,848 | 2/1959 | Wall et al. | 126—215 |

FREDERICK L. MATTESON, Jr., *Primary Examiner.*

E. G. FAVORS, *Assistant Examiner.*